(12) United States Patent
Mishrikey et al.

(10) Patent No.: US 10,923,909 B2
(45) Date of Patent: Feb. 16, 2021

(54) INRUSH LIMITER FOR BIDIRECTIONAL SOLID STATE SWITCHES

(71) Applicant: TE CONNECTIVITY CORPORATION, Berwyn, PA (US)

(72) Inventors: Matthew Mishrikey, Roslindale, MA (US); Frank Peter Wahl, III, Ventura, CA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 291 days.

(21) Appl. No.: 16/028,630

(22) Filed: Jul. 6, 2018

(65) Prior Publication Data

US 2020/0014197 A1 Jan. 9, 2020

(51) Int. Cl.
*H02H 9/02* (2006.01)
*H02H 9/00* (2006.01)

(52) U.S. Cl.
CPC .............. *H02H 9/025* (2013.01); *H02H 9/002* (2013.01)

(58) Field of Classification Search
CPC .......... H02H 9/002; H02H 9/02; H02H 9/025; H02H 1/043; H02H 1/046
See application file for complete search history.

(56) References Cited

U.S. PATENT DOCUMENTS

| | | | | |
|---|---|---|---|---|
| 5,796,274 A * | 8/1998 | Willis | .................. | H03K 17/162 307/44 |
| 6,225,797 B1 * | 5/2001 | Willis | ..................... | G05F 1/573 323/351 |
| 9,711,962 B2 | 7/2017 | Andrea | | |
| 9,985,431 B2 * | 5/2018 | Wohlfarth | ................ | H02H 9/02 |
| 2010/0270982 A1 | 10/2010 | Hausman, Jr. et al. | | |
| 2011/0187286 A1 | 8/2011 | Salvestrini et al. | | |
| 2012/0026636 A1 | 2/2012 | Chai et al. | | |
| 2014/0254235 A1 * | 9/2014 | Rahman | ................. | G11C 5/148 365/145 |
| 2018/0062520 A1 * | 3/2018 | Katrak | ..................... | H02M 1/36 |
| 2018/0367040 A1 * | 12/2018 | Birth | ........................ | H02M 3/07 |
| 2019/0280477 A1 * | 9/2019 | Karanth | ................. | H02H 9/002 |
| 2019/0379277 A1 * | 12/2019 | Jain | .......................... | H05B 6/06 |

FOREIGN PATENT DOCUMENTS

| | | |
|---|---|---|
| DE | 10 2008 018619 A1 | 10/2009 |
| EP | 2 413 448 A2 | 2/2012 |

OTHER PUBLICATIONS

International Search Report, International Application No. PCT/IB2019/055525, International Filing Date, Jul. 6, 2018.

* cited by examiner

*Primary Examiner* — Peter M Novak

(57) ABSTRACT

A bidirectional switch and a method of the bidirectional switch including, a first enhancement mode n-channel metal oxide semiconductor field effect transistor (n-MOSFET) and a second n-MOSFET electrically connected in a common source configuration. The emitter of an insulated gate bipolar transistor (IGBT) is further electrically connected to the common sources of the n-MOSFET. A control board regulates a first operation of the IGBT and an operation of the first field effect transistor. The control board additionally receives at least one measured characteristic, from a sensor and determines the measured characteristic is below a predetermined threshold. The control board then regulates an operation of the second field effect transistor and a second operation of the IGBT.

5 Claims, 12 Drawing Sheets

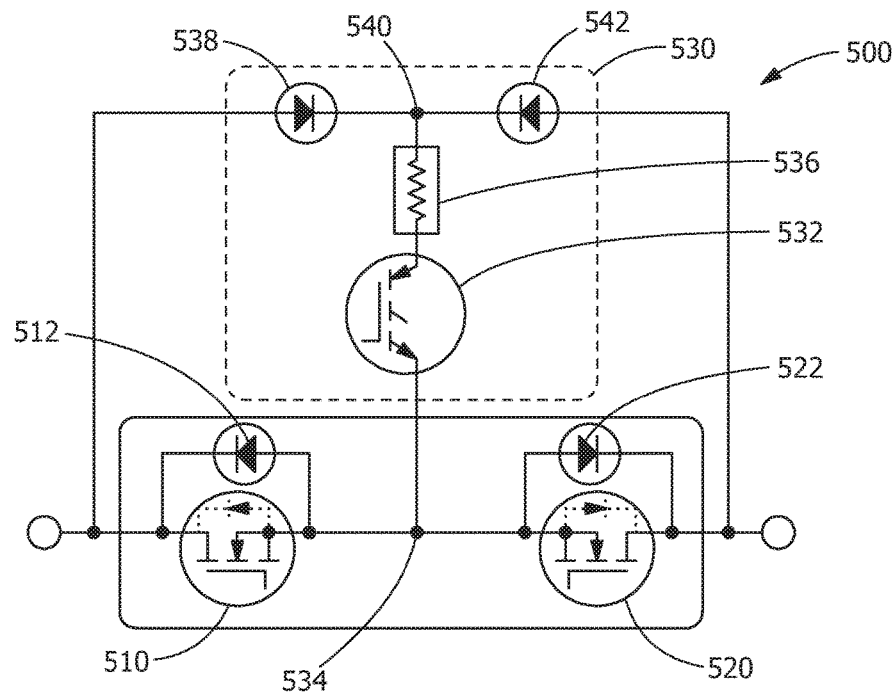
FIG. 5A
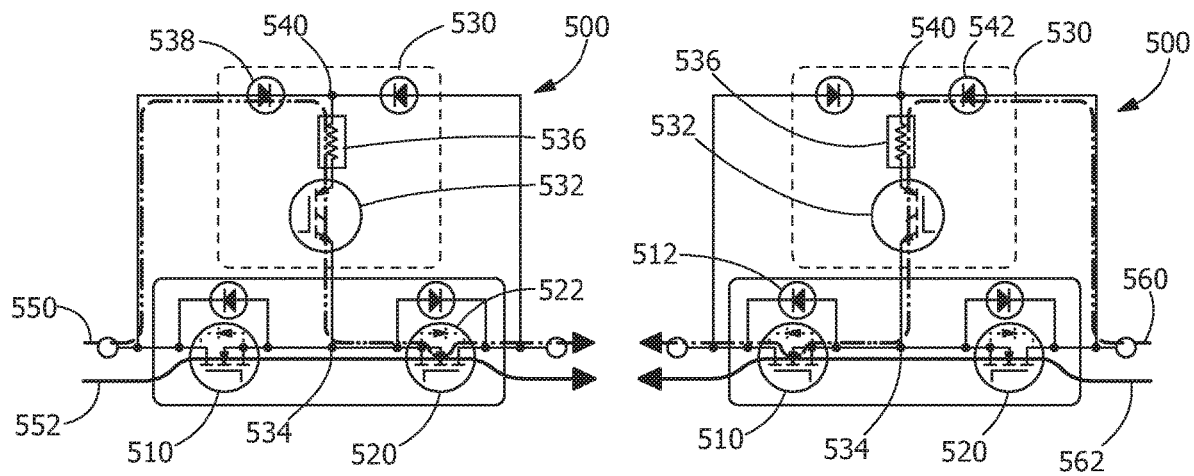
FIG. 5B
FIG. 5C

INRUSH LIMITER FOR BIDIRECTIONAL SOLID STATE SWITCHES

FIELD OF THE INVENTION

The present invention is directed to the protection of electrical systems for current and voltage spikes. More particularly, the present invention is directed to the protection of solid state switches from current and voltage spikes.

BACKGROUND OF THE INVENTION

Loads in electrical systems typically exhibit a load capacitance and/or load inductance in addition to the load resistance. Solid state switches may be used to energize/de-energize the load. When a switch is engaged the applied voltage may see a capacitance due to the load. The impedance of an uncharged capacitor is initially essentially zero. A large inrush of current can result which can potentially damage the solid state switch and/or the load. Similarly, if the load exhibits an inductance, such as with the coils of an electric motor, when the switch is disengaged the inductance will cause a voltage spike. This spike may also cause damage to the solid state switch.

BRIEF DESCRIPTION OF THE INVENTION

In an embodiment, a method of regulating the operation of a bidirectional switch including at least one sensor, a first field effect transistor and a second field effect transistor electrically connected in a common source configuration. Each field effect transistor may optionally have a Schottky diode electrically connected between the source and drain. Each field effect transistor is independently electrically connected to a gate driver circuit. The bidirectional switch also includes a control board including a memory and a processor.

The method includes regulating, by the control board, a first operation of the switch. The method further includes regulating, by the control board, an operation of the first field effect transistor. The method further includes receiving, by the control board, at least one measured characteristic, from the at least one sensor. The method further includes determining, by the control board, the measured characteristic is below a predetermined threshold. The method further includes regulating, by the control board, an operation of the second field effect transistor. The method further includes regulating, by the control board, a second operation of the switch.

In another embodiment, an electrical system, including a bidirectional switch. The bidirectional switch includes at least one sensor, a first field effect transistor and a second field effect transistor electrically connected in a common source configuration. Each field effect transistor may optionally have a Schottky diode electrically connected between the source and drain. Each field effect transistor is independently electrically connected to a gate driver circuit. The electrical system additionally includes a control board including a processor, and a memory.

The memory contains instructions that when executed by the processor cause the system to regulate, by the control board, a first operation of the switch. The system further regulates, by the control board, an operation of the first field effect transistor. The system further receives, by the control board, at least one measured characteristic, from the at least one sensor. The system further determines, by the control board, the measured characteristic is below a predetermined threshold. The system further regulates, by the control board, an operation of the second field effect transistor. The system further regulates, by the control board, a second operation of the switch.

In another embodiment, a bidirectional switch including a first enhancement mode n-channel metal oxide semiconductor field effect transistor having a source, a gate, and a drain and a second enhancement mode n-channel metal oxide semiconductor field effect transistor having a source, a gate, and a drain. The source of the second enhancement mode n-channel metal oxide semiconductor field effect transistor is electrically connected to the source of the first enhancement mode n-channel metal oxide semiconductor field effect transistor. The bidirectional switch also includes an insulated gate bipolar transistor having an emitter, a gate, and a collector. The emitter of the insulated gate bipolar transistor is electrically connected to the source of the first enhancement mode n-channel metal oxide semiconductor field effect transistor and the source of the second enhancement mode n-channel metal oxide semiconductor field effect transistor.

Other features and advantages of the present invention will be apparent from the following more detailed description, taken in conjunction with the accompanying drawings which illustrate, by way of example, the principles of the invention.

BRIEF DESCRIPTION OF THE DRAWINGS

FIG. 5A, is a schematic diagram of a bidirectional switching circuit, according to an embodiment.

FIG. 5B, is a schematic diagram of a bidirectional switching circuit, according to an embodiment.

FIG. 5C, is a schematic diagram of a bidirectional switching circuit, according to an embodiment.

Wherever possible, the same reference numbers will be used throughout the drawings to represent the same parts.

DETAILED DESCRIPTION OF THE INVENTION

Provided is an electrical switching circuit capable of reducing or eliminating current inrush and voltage spikes associated with energizing/de-energizing an electrical system. Embodiments of the present disclosure, for example, in comparison to concepts failing to include one or more of the features disclosed herein, provide a bidirectional solid state switching circuit capable of reducing or eliminating current inrush and voltage spikes experienced by capacitive and inductive loads.

Electrical systems can experience current inrush when the system is energized/de-energized. Many electrical systems exhibit a sizable capacitance. When the switch is closed and the circuit energized a capacitor initially exhibits substantially zero impedance at the beginning of charging. This low impedance may allow an inrush of current many times larger than the steady state current to initially flow through the circuit. These large currents may potentially damage circuit elements or cause safety devices, such as fuses or circuit breakers to discontinue operation of the circuit.

Figure 1:
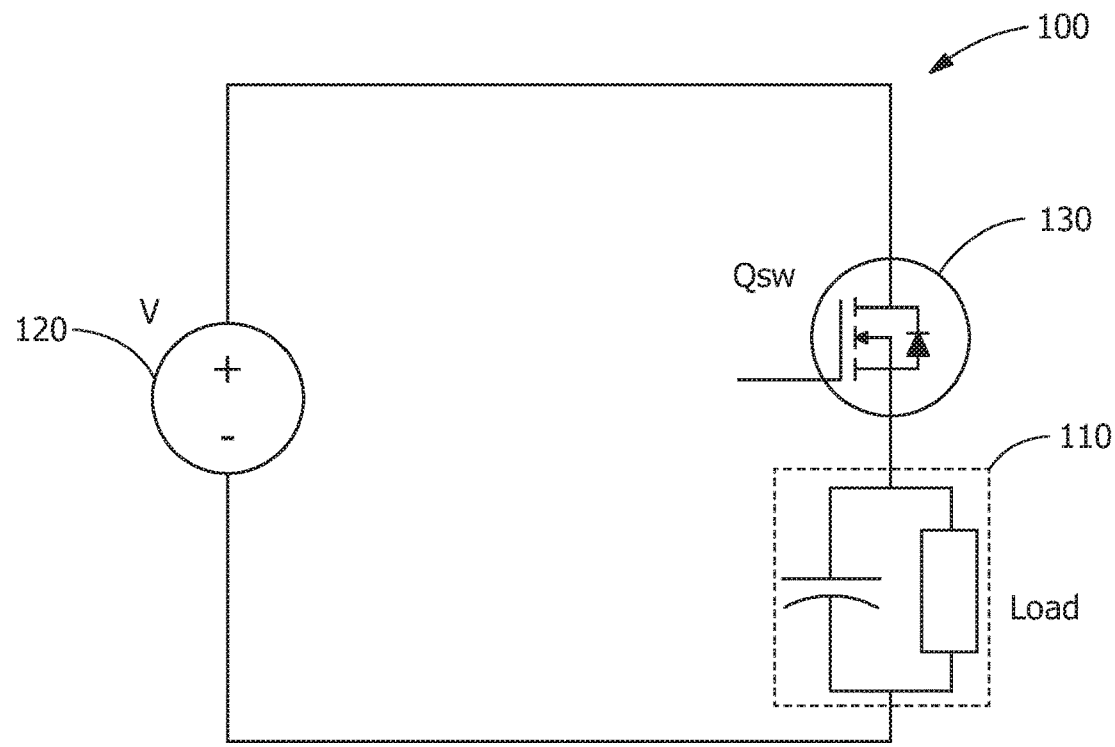
FIG. 1 is a schematic diagram of a conventional switching circuit, including a capacitive load.

Many electrical systems employ transistors as solid state switches for the control of operation. FIG. 1 is a schematic of a conventional circuit 100. A load 110 exhibiting a capacitance as represented by a capacitor 112 is connected to a power source 120 via a solid state switch 130. In the example of FIG. 1, an enhancement mode n-channel metal oxide semiconductor field effect transistor (MOSFET) is used as the solid state switch 130. When the solid state switch 130 is closed, the power source sees a low impedance through the capacitor 112 of the load 110 allowing an inrush of current through the solid state switch 130 as the capacitor 112 begins charging.

Electrical systems can experience voltage spikes when the system is energized/de-energized. The voltage spike may be many times larger than the typical operating voltage of the circuit. Such a large voltage may potentially damage circuit components.

Figure 2:
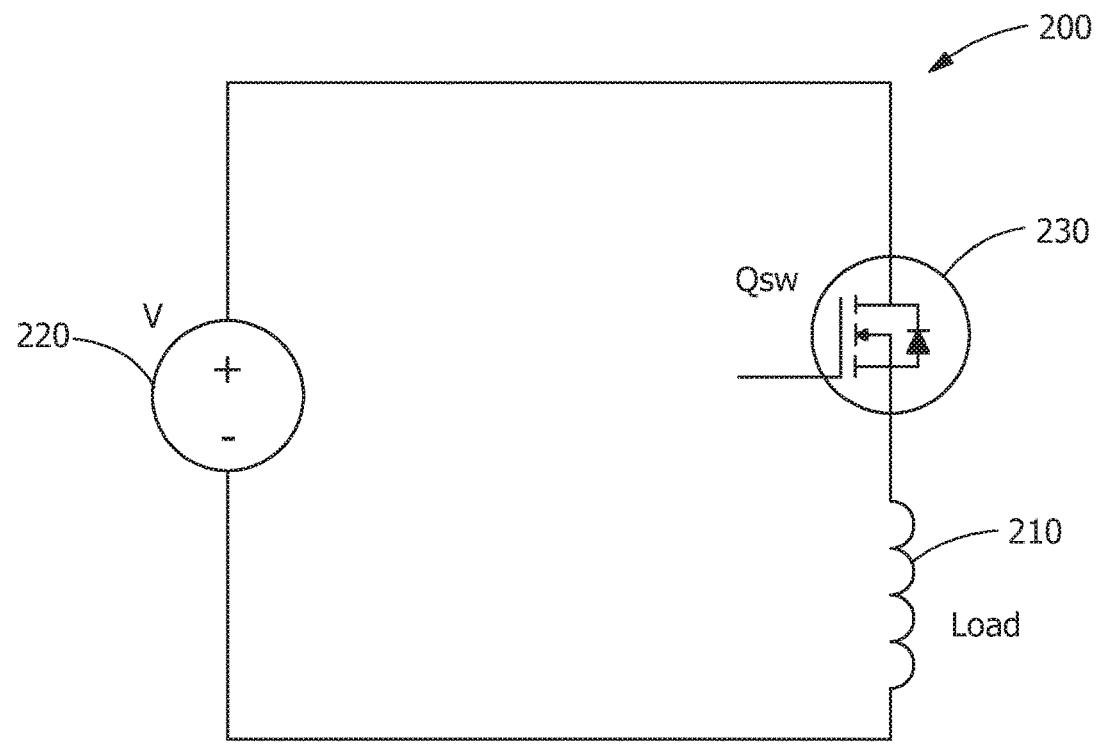
FIG. 2 is a schematic diagram of a conventional switching circuit, including a inductive load.

FIG. 2 is a schematic of a conventional circuit 200. An inductive load 210 is connected to a power source 220 via a solid state switch 230. In the example of FIG. 2, an enhancement mode n-channel MOSFET is used as the solid state switch 230. When the solid state switch 230 is opened, a voltage spike, also known as inductive kickback, results as the inductor opposes the rapid change in current.

The reduction of inrush current and inductive kickback is known as inrush current limiting and inductive kickback limiting. As used herein, the term soft switching includes both inrush current limiting and inductive kickback limiting.

Figure 3:
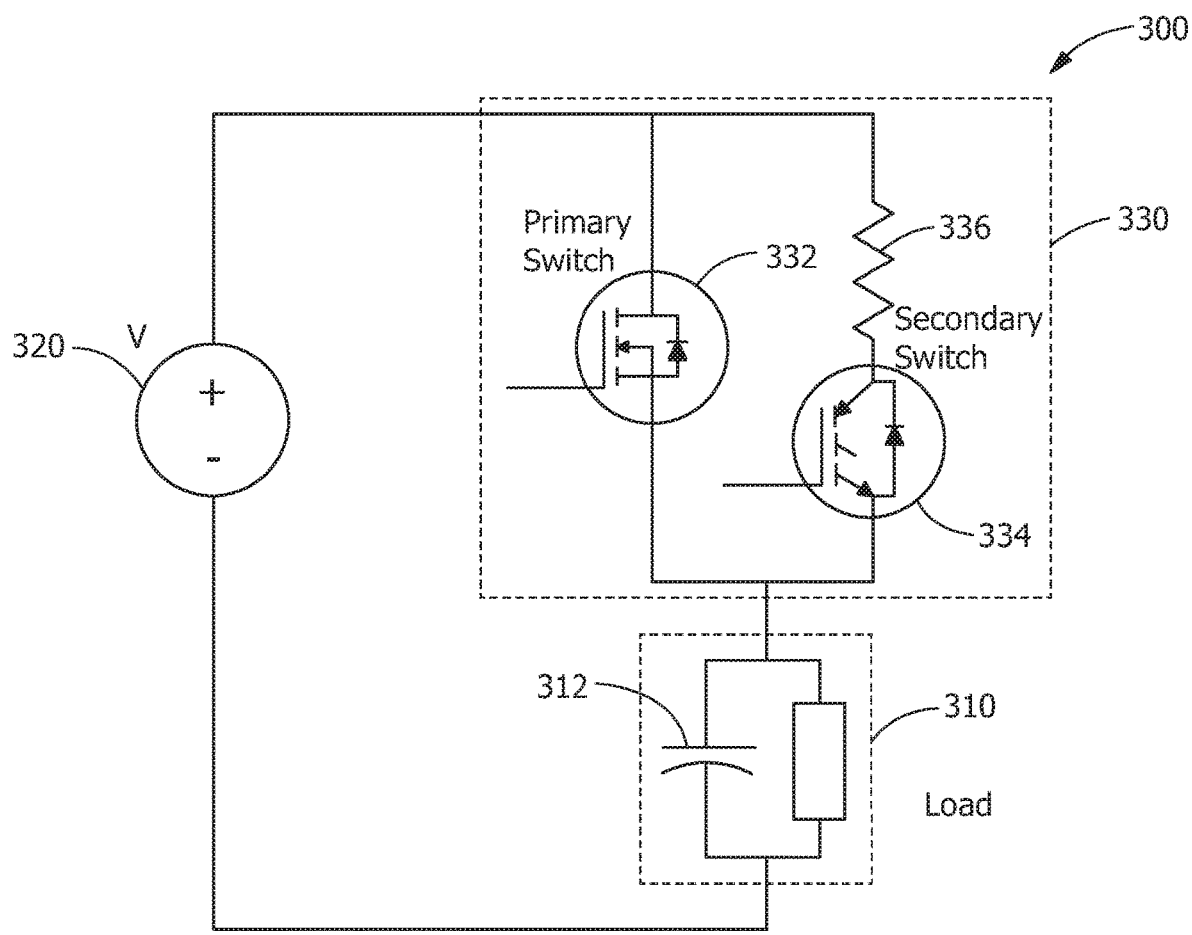
FIG. 3 is a schematic diagram of a conventional switching circuit, including an inrush switch, including a capacitive load.

A conventional approach to inrush current limiting in a circuit with a capacitive load is illustrated in the circuit 300 of FIG. 3. In the example of FIG. 3, a load 310 exhibiting a capacitance as represented by a capacitor 312 is connected to a power source 320 via a solid state switch 330, which includes a primary switch 332 in parallel with a secondary switch 334 and a resistor 336. In the example of FIG. 3, an enhancement mode n-channel MOSFET is used as the primary switch 332 and an n-channel insulated gate bipolar transistor (IGBT) is used as the secondary switch 334.

When the solid state switch 330 is initially closed only the secondary switch 334 is closed. The resistor 336 adds impedance to the circuit 300 limiting the current while the capacitor 312 charges. After the capacitor 312 is substantially charged the primary switch 332 is closed and the secondary switch 334 is opened. The substantially charged capacitor 312 provides sufficient impedance to the circuit 300 to limit current inrush. The use of the primary switch 332 for steady state operation of the circuit 300 increases efficiency in the circuit 300 by bypassing the resistor 336.

Figure 4:
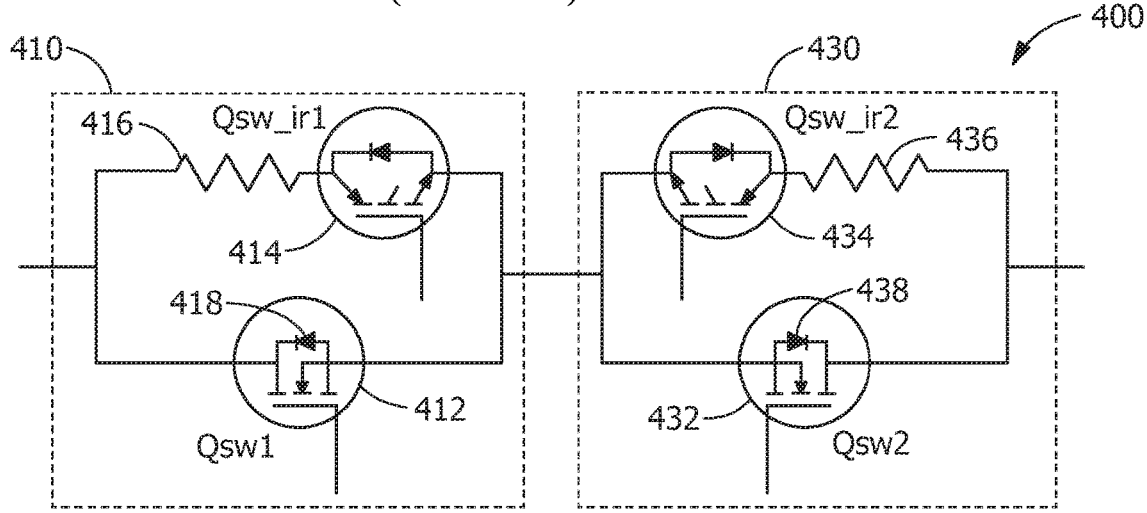
FIG. 4 is a schematic diagram of a conventional bidirectional switching circuit, including two inrush switches.

Bidirectional switches may be susceptible to current inrush and inductive kickback in both directions. A conventional approach to bidirectional inrush current limiting is illustrated in FIG. 4. In the example of FIG. 4, a bidirectional switch 400 includes a first solid state switch 410 further including a first primary switch 412 in parallel with a first secondary switch 414 and resistor 416. In the example of FIG. 4, an enhancement mode n-channel MOSFET is used as the first primary switch 412 and an n-channel insulated gate bipolar transistor (IGBT) is used as the first secondary switch 414. The MOSFET further includes a body diode 418 between the drain and source of the MOSFET.

The bidirectional switch 400 further includes a second solid state switch 430 in a back-to-back (e.g., common source) configuration with the first solid state switch 410. The second solid state switch 430 further includes a second primary switch 432 in parallel with a second secondary switch 434 and resistor 436. In the example of FIG. 4, an enhancement mode n-channel MOSFET is used as the second primary switch 432 and an n-channel insulated gate bipolar transistor (IGBT) is used as the second secondary switch 434. The MOSFET further includes a body diode 438 between the drain and source of the MOSFET.

In the example of FIG. 4, forward pre-charge conduction may be done through resistor 416, first secondary switch 414, and body diode 438. After pre-charge is complete forward conduction may be routed through the first primary switch 412 to bypass the resistor 416 and improve efficiency. During reverse pre-charge conduction the resistor 436, second secondary switch 434, and body diode 418 may be used. After pre-charge is complete reverse conduction may be routed through the second primary switch 432 to bypass the resistor 436 and improve efficiency.

FIG. 5A illustrates an embodiment of a bidirectional switch 500. In the example of FIG. 5, the bidirectional switch 500 includes a primary switching circuit 502 having a first enhancement mode n-channel MOSFET solid state switch 510. The first enhancement mode n-channel MOSFET solid state switch 510 includes a body diode 512. The first enhancement mode n-channel MOSFET solid state switch 510 is connected in a back-to-back (e.g., common source) configuration with a second enhancement mode n-channel MOSFET solid state switch 520. The second enhancement mode n-channel MOSFET solid state switch 520 includes a body diode 522.

The bidirectional switch 500 further includes an inrush switch 530. The inrush switch 530 includes an n-channel insulated gate bipolar transistor (IGBT) 532. The emitter of the n-channel insulated gate bipolar transistor 532 is electrically connected to the common sources of the first enhancement mode n-channel MOSFET solid state switch 510 and the second enhancement mode n-channel MOSFET solid state switch 520 at node 534. An inrush resistor 536 is electrically connected to the collector of the n-channel insulated gate bipolar transistor 532. A first inrush diode 538 is electrically connected from the drain of the first enhancement mode n-channel MOSFET solid state switch 510 to node 540. The node 540 is further electrically connected to the inrush resistor 536. A second inrush diode 542 is electrically connected from the drain of the second enhancement mode n-channel MOSFET solid state switch 520 to node 540. In some embodiments, a MOSFET may be used in place of the insulated gate bipolar transistor 532. In some embodiments, an IGBT may be used in place of one or more of the MOSFETs 510, 520.

The bidirectional switch 500 may employ various other types of transistors as alternatives to the insulated gate bipolar transistor (IGBT) and metal oxide semiconductor field effect transistors (MOSFET) used in the example of FIG. 5A. In some embodiments, one or more of the transistors of FIG. 5 may be replaced with a junction field effect transistor, metal nitride oxide semiconductor field effect transistor, fast recovery epitaxial diode field effect transistor, heterostructure insulated gate field effect transistor, modulation doped field effect transistor, tunnel field effect transistor, high electron mobility field effect transistor, or metal semiconductor field effect transistor.

FIG. 5B illustrates a current flow in a first direction through the bidirectional switch 500. When the bidirectional switch 500 is initially closed a voltage is applied to the gate of the insulated gate bipolar transistor 532 causing the insulated gate bipolar transistor 532 to conduct between the emitter and collector. A voltage is also applied to the gate of the second MOSFET solid state switch 520 causing the second MOSFET solid state switch 520 to conduct between the source and drain. A current is directed along a first inrush current path 550 through the inrush switch 530 and the second enhancement mode n-channel MOSFET solid state switch 520. The first inrush current path 550 includes the first inrush diode 538, node 540, inrush resistor 536, and n-channel insulated gate bipolar transistor 532 to node 534. The first inrush current path 550 also includes the second n-channel MOSFET solid state switch 520 and body diode 522. The inrush resistor 536 adds impedance which limits the inrush of the current through the first inrush current path 550.

After an initial pre-charge period the first enhancement mode n-channel MOSFET solid state switch 510 is closed, by applying a suitable gate voltage, allowing the current to follow a steady state current path 552 thus bypassing the inrush switch 530. In some embodiments, a suitable gate voltage is subsequently applied to the insulated gate bipolar transistor 532 causing the insulated gate bipolar transistor 532 to become non-conductive between the emitter and collector. In some embodiments, the insulated gate bipolar transistor 532 is continually operated during the steady state operation of the bidirectional switch 500. In some embodiments, the impedance encountered by the current following steady state current path 552 is less than the impedance encountered by the current following the first inrush current path 550.

When it is desired to discontinue operation of the bidirectional switch 500, the above steps may be performed in reverse order. The insulated gate bipolar transistor 532 may be reactivated if needed. The operation of the first enhancement mode n-channel MOSFET solid state switch 510 is discontinued causing all of the operating current to flow through the inrush switch 530. The operation of the second MOSFET solid state switch 520 is then discontinued. Any resulting voltage kickback, such as from an inductive load, will encounter the impedance of the inrush resistor 536 which dissipates the energy without harming the electrical components.

FIG. 5C illustrates a current flow in a second direction through the bidirectional switch 500. When the bidirectional switch 500 is initially closed a current is directed along a second inrush current path 560 through the inrush switch 530 and the first enhancement mode n-channel MOSFET solid state switch 510. The second inrush current path 560 initially includes the second inrush diode 542, node 540, inrush resistor 536, and n-channel insulated gate bipolar transistor 532 to node 534. The second inrush current path 560 also includes the first n-channel MOSFET solid state switch 510 and body diode 512. The inrush resistor 536 adds impedance which limits the inrush of the current through the second inrush current path 560.

After an initial pre-charge period the second enhancement mode n-channel MOSFET solid state switch 520 is closed allowing the current to follow a second steady state current path 562 thus bypassing the inrush switch 530. In some embodiments, a suitable gate voltage is subsequently applied to the insulated gate bipolar transistor 532 causing the insulated gate bipolar transistor 532 to become non-conductive between the emitter and collector. In some embodiments, the insulated gate bipolar transistor 532 is continually operated during the steady state operation of the bidirectional switch 500. In some embodiments, the impedance encountered by the current following the second steady state current path 562 is less than the impedance encountered by the current following second inrush current path 560.

The configuration of the inrush switch 530 places the inrush resistor 536, and the n-channel insulated gate bipolar transistor 532 in both the first inrush current path 550 and the second inrush current path 560. In comparison to the conventional bidirectional switch 400 of FIG. 4, the bidirectional switch 500 uses only one transistor and one resistor versus the two transistors and two resistor configuration of FIG. 4. The reduction of the number of transistors may result in a cost savings during manufacture and a reduction in the space occupied on a circuit board or chip.

Figure 6:
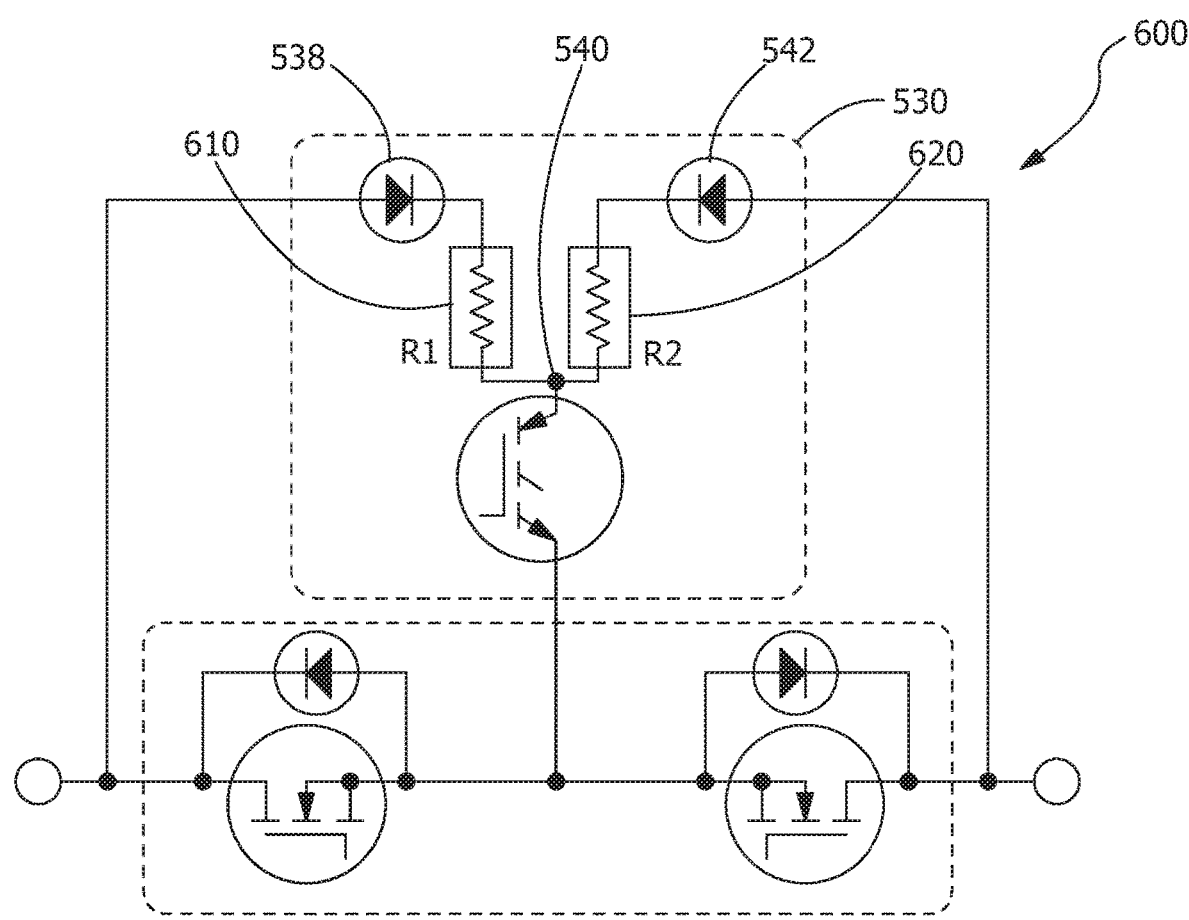
FIG. 6, is a schematic diagram of a bidirectional switching circuit, according to an embodiment.

FIG. 6 illustrates an embodiment of a bidirectional switch 600. The bidirectional switch 600 is the same as the bidirectional switch 500 except that the inrush resistor 536 has been removed from the inrush switch 530 and replaced with a first inrush resistor 610 located between the first inrush diode 538 and the node 540 and a second inrush resistor 620 located between the node 540 and the second inrush diode 542. The first inrush resistor 610 and the second inrush resistor 620 may be the same or different. In some embodiments, the first inrush resistor 610 is different from the second inrush resistor 620. The inclusion of two different resistance values allows the RC time constant of the circuit to be customized for each of the first and second inrush current paths 550, 560.

Figure 7:
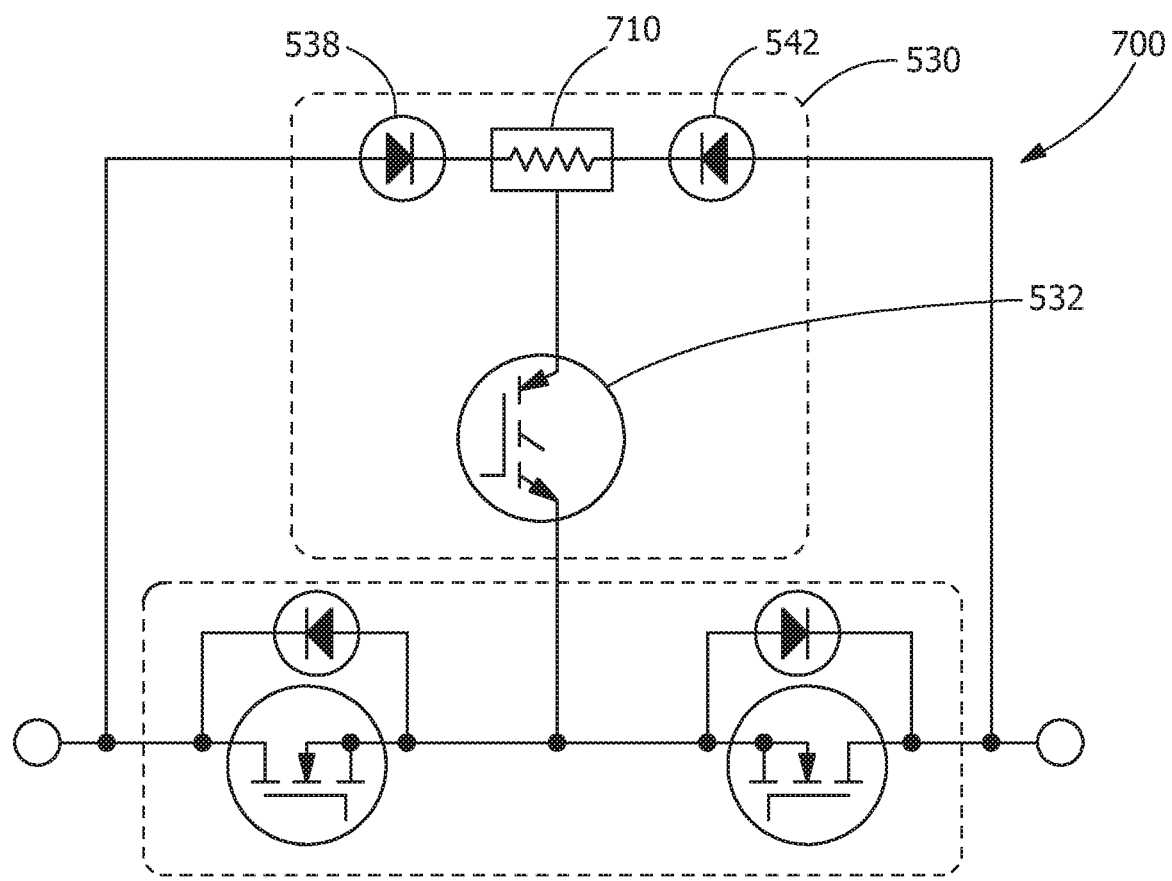
FIG. 7, is a schematic diagram of a bidirectional switching circuit, according to an embodiment.

FIG. 7 illustrates an embodiment of a bidirectional switch 700. The bidirectional switch 700 is the same as the bidirectional switch 500 except that the inrush resistor 536 and node 540 have been removed from the inrush switch 530 and replaced with a center tapped inrush resistor 710. The center tapped inrush resistor 710 may exhibit a resistance between the first inrush diode 538 and the n-channel insulated gate bipolar transistor 532 which may be the same or different to the resistance exhibited by the center tapped inrush resistor 710 between the second inrush diode 542 and the n-channel insulated gate bipolar transistor 532. In some embodiments, the resistance between the first inrush diode 538 and the n-channel insulated gate bipolar transistor 532 is different from the resistance exhibited by the center tapped inrush resistor 710 between the second inrush diode 542 and the n-channel insulated gate bipolar transistor 532. The inclusion of two different resistance values allows the RC time constant of the circuit to be customized for each of the first and second inrush current paths 550, 560.

Figure 8:
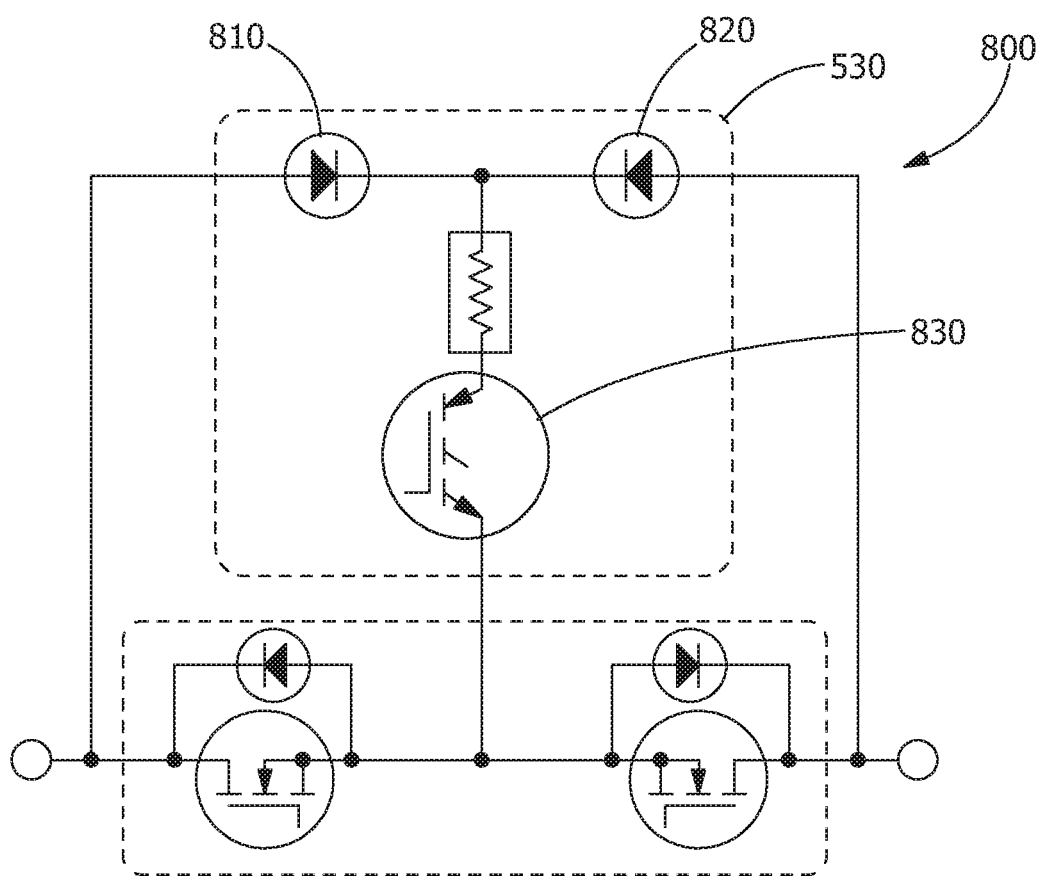
FIG. 8, is a schematic diagram of a bidirectional switching circuit, according to an embodiment.

FIG. 8 illustrates an embodiment of a bidirectional switch 800. The bidirectional switch 800 is the same as the bidirectional switch 500 except that the first inrush diode 538 has been reversed as a reversed first inrush diode 810 and the second inrush diode 542 has been reversed as a reversed second inrush diode 820. The n-channel insulated gate bipolar transistor 532 of the bidirectional switch 500 has additionally been replaced with a p-channel insulated gate bipolar transistor 830.

Figure 9:
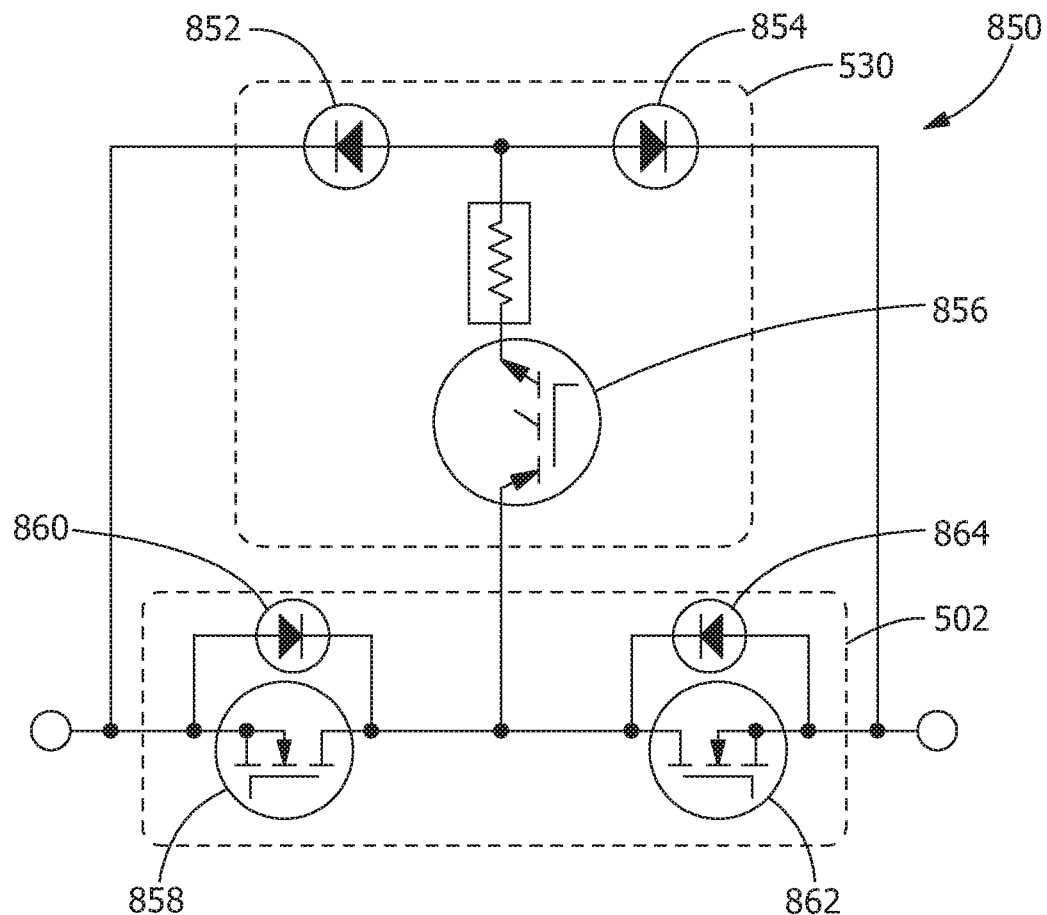
FIG. 9, is a schematic diagram of a bidirectional switching circuit, according to an embodiment.

FIG. 9 is an embodiment of a bidirectional switch 850. The bidirectional switch 850 is the same as the bidirectional switch 500 except that the first inrush diode 538 has been reversed as a reversed first inrush diode 852 and the second inrush diode 542 has been reversed as a reversed second inrush diode 854. The n-channel insulated gate bipolar transistor 532 of the bidirectional switch 500 has additionally reversed as a reversed a reversed n-channel insulated gate bipolar transistor 856. The first enhancement mode n-channel MOSFET solid state switch 510, body diode 512, second enhancement mode n-channel MOSFET solid state switch 520, and body diode 522 of the primary switching circuit 502 are also reversed as first reversed enhancement mode n-channel MOSFET solid state switch 858, body diode 860, second enhancement mode n-channel MOSFET solid state switch 862, and body diode 864. The reversed transistors 856, 858, and 862 are connected in a common drain configuration.

Figure 10:
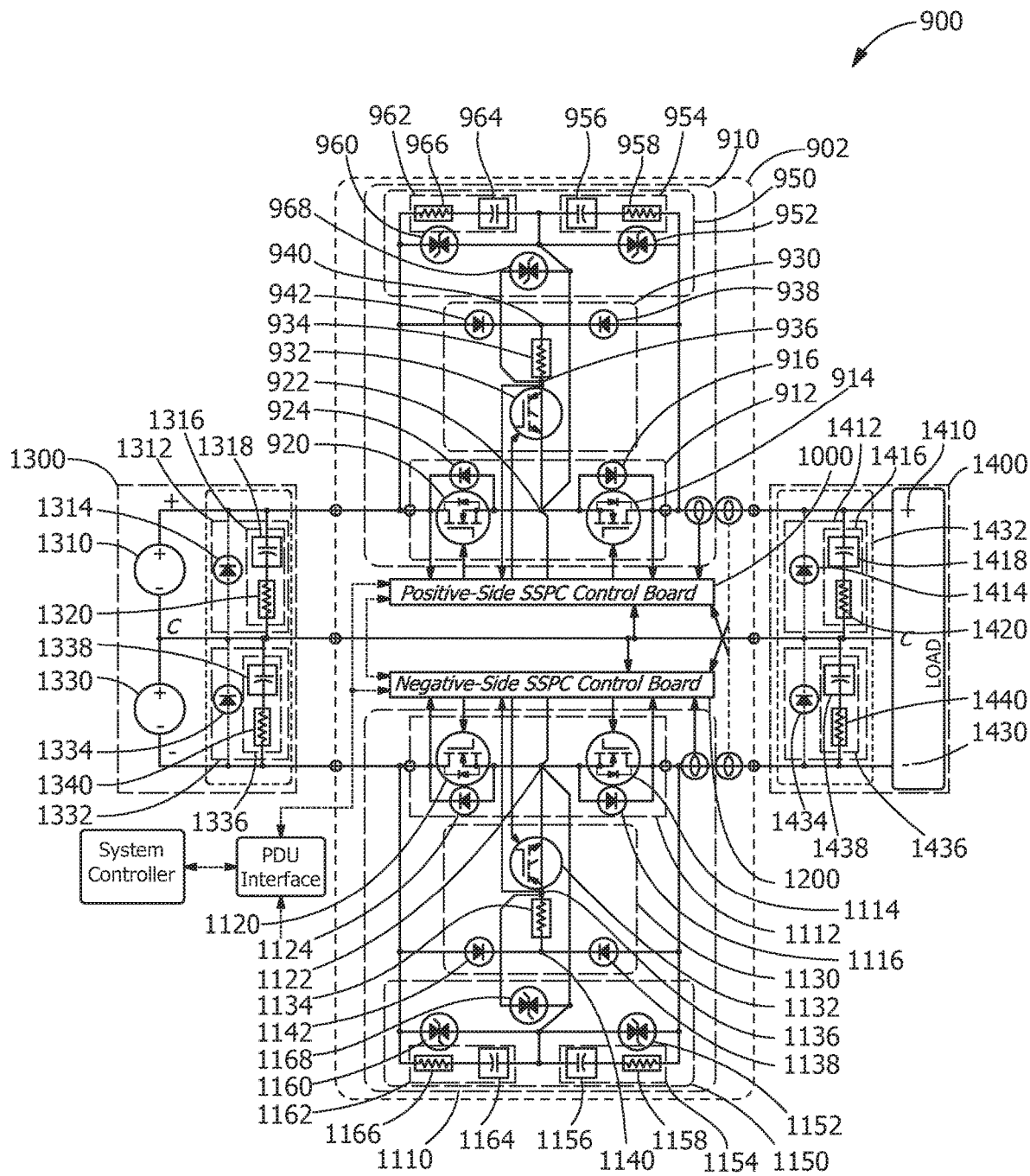
FIG. 10, is a schematic diagram of a dual rail, bidirectional, solid-state power controller, according to an embodiment.

FIG. 10 is a schematic of an exemplary power system 900 including a dual-rail bidirectional solid-state power controller 902. The power controller 902 includes a positive rail bidirectional switch 910. The bidirectional switch 910 includes a primary positive rail bidirectional switch 912. The primary positive rail bidirectional switch 912 includes a first enhancement mode n-channel MOSFET solid state switch 914. The first enhancement mode n-channel MOSFET solid state switch 914 includes a body diode 916. The first enhancement mode n-channel MOSFET solid state switch 914 is connected in a back-to-back (e.g., common source) configuration with a second enhancement mode n-channel MOSFET solid state switch 920 at node 922. The second enhancement mode n-channel MOSFET solid state switch 920 includes a body diode 924.

The bidirectional switch 910 further includes an inrush switch 930. The inrush switch 930 includes an n-channel insulated gate bipolar transistor (IGBT) 932. The emitter of the n-channel insulated gate bipolar transistor 932 is electrically connected to the common sources of the first enhancement mode n-channel MOSFET solid state switch 914 and the second enhancement mode n-channel MOSFET solid state switch 920 at node 922. An inrush resistor 934 is electrically connected to the collector of the n-channel insulated gate bipolar transistor 932 at node 936. A first inrush diode 938 is electrically connected from the drain of the first enhancement mode n-channel MOSFET solid state switch 914 to node 940. The node 940 is further electrically connected to the inrush resistor 934. A second inrush diode 942 is electrically connected between the drain of the second enhancement mode n-channel MOSFET solid state switch 920 and node 940.

The bidirectional switch 910 may additionally include a noise and transient suppression module 950. A first transient voltage surge suppressor (TVSS) 952 is electrically connected between the node 922 and the drain of the first enhancement mode n-channel MOSFET solid state switch 914. A first RC snubber 954 including a first snubber capacitor 956 and a first snubber resistor 958 is electrically connected, in parallel with the first TVSS 952, between the node 922 and the drain of the first enhancement mode n-channel MOSFET solid state switch 914. In an alternate embodiment, the TVSS 952 may be replaced with at least one avalanche diode or at least one transient voltage surge suppressor or other current protection element.

The first TVSS 952 and the first RC snubber 954 are connected in parallel with the source to drain pathway of the first enhancement mode n-channel MOSFET solid state switch 914. An avalanche voltage of the first TVSS 952, a capacitance of the first snubber capacitor 956 and a resistance of the first snubber resistor 958 may be predetermined to protect the first enhancement mode n-channel MOSFET solid state switch 914 from excessive current and/or voltage, such as during current inrush or voltage kickback. For example, if a voltage exceeds the predetermined avalanche voltage of the TVSS 952, the TVSS 952 will conduct, thereby shunting the resulting current around the first enhancement mode n-channel MOSFET solid state switch 914 to protect the switch.

A second TVSS 960 is electrically connected between the node 922 and the drain of the second enhancement mode n-channel MOSFET solid state switch 920. A second RC snubber 962 including a second snubber capacitor 964 and a second snubber resistor 966 is electrically connected, in parallel with the second TVSS 960, between the node 922 and the drain of the second enhancement mode n-channel MOSFET solid state switch 920. The second TVSS 960 and second RC snubber 962 are in parallel with the source to drain pathway of the second enhancement mode n-channel MOSFET solid state switch 920. An avalanche voltage of the second TVSS 960, a capacitance of the second snubber capacitor 964 and a resistance of the second snubber resistor 966 may be predetermined to protect the second enhancement mode n-channel MOSFET solid state switch 920 from excessive current and/or voltage, such as during current inrush or voltage kickback.

A third TVSS 968 is electrically connected between a node 936 and the node 922. The third TVSS 968 is in parallel with the emitter to collector pathway of the n-channel insulated gate bipolar transistor 932. An avalanche voltage of the third TVSS 960, may be predetermined to protect the n-channel insulated gate bipolar transistor 932 from excessive current and/or voltage, such as during current inrush or voltage kickback.

In the example of FIG. 10, a positive-side control board 1000 monitors and regulates the operation of the bidirectional switch 910. The positive-side control board 1000 may include at least one sensor configured to measure at least one characteristic (e.g., voltage and/or current) of the power controller 902. The at least one characteristic may be measured at any location in the bidirectional switch 910.

The positive-side control board 1000 may further include a memory and a processor which may store and process instructions to control the bidirectional switch 910. In some embodiments, the memory and/or processor may be integral to the power controller 902. In some embodiments, the memory and/or processor may be located remotely. In some embodiments, the remote memory and/or processor may be accessed via a wired connection. In some embodiments, the remote memory and/or processor may be accessed wirelessly.

The power controller 902 further includes a negative rail bidirectional switch 1110. The bidirectional switch 1110 includes a primary negative rail bidirectional switch 1112. The primary bidirectional switch 1112 includes a first enhancement mode n-channel MOSFET solid state switch 1114. The first enhancement mode n-channel MOSFET solid state switch 1114 includes a body diode 1116. The first enhancement mode n-channel MOSFET solid state switch 1114 is connected in a back-to-back (e.g., common source) configuration with a second enhancement mode n-channel MOSFET solid state switch 1120 at node 1122. The first enhancement mode n-channel MOSFET solid state switch 1120 includes a body diode 1124.

The bidirectional switch 1110 further includes an inrush switch 1130. The inrush switch 1130 includes an n-channel insulated gate bipolar transistor (IGBT) 1132. The emitter of the n-channel insulated gate bipolar transistor 1132 is electrically connected to the common sources of the first enhancement mode n-channel MOSFET solid state switch 1114 and the second enhancement mode n-channel MOSFET solid state switch 1120 at node 1122. An inrush resistor 1134 is electrically connected to the collector of the n-channel insulated gate bipolar transistor 1132 at node 1136. A first inrush diode 1138 is electrically connected from the drain of the first enhancement mode n-channel MOSFET solid state switch 1114 to node 1140. The node 1140 is further electrically connected to the inrush resistor 1134. A second inrush diode 1142 is electrically connected between the drain of the second enhancement mode n-channel MOSFET solid state switch 1120 and node 1140.

The bidirectional switch 1110 may additionally include a noise and transient suppression module 1150. A first TVSS 1152 is electrically connected between the node 1122 and the drain of the first enhancement mode n-channel MOSFET solid state switch 1114. A first RC snubber 1154 including a first snubber capacitor 1156 and a first snubber resistor 1158 is electrically connected, in parallel with the first TVSS 1152, between the node 1122 and the drain of the first enhancement mode n-channel MOSFET solid state switch 1114.

The first TVSS 1152 and the first RC snubber 1154 are connected in parallel with the source to drain pathway of the first enhancement mode n-channel MOSFET solid state switch 1114. An avalanche voltage of the first TVSS 1152, a capacitance of the first snubber capacitor 1156 and a resistance of the first snubber resistor 1158 may be predetermined to protect the first enhancement mode n-channel MOSFET solid state switch 1114 from excessive current and/or voltage, such as during current inrush or voltage kickback. For example, if a voltage exceeds the predetermined avalanche voltage of the first TVSS 1152, the first TVSS 1152 will conduct, thereby shunting the resulting current around the first enhancement mode n-channel MOSFET solid state switch 1114 to protect the switch.

A second TVSS 1160 is electrically connected between the node 1122 and the drain of the second enhancement mode n-channel MOSFET solid state switch 1120. A second RC snubber 1162 including a second snubber capacitor 1164 and a second snubber resistor 1166 is electrically connected, in parallel with the second TVSS 1160, between the node 1122 and the drain of the second enhancement mode n-channel MOSFET solid state switch 1120. The second TVSS 1160 and second RC snubber 1162 are in parallel with the source to drain pathway of the second enhancement mode n-channel MOSFET solid state switch 1120. An avalanche voltage of the second TVSS 1160, a capacitance of the second snubber capacitor 1164 and a resistance of the second snubber resistor 1166 may be predetermined to protect the second enhancement mode n-channel MOSFET solid state switch 1120 from excessive current and/or voltage, such as during current inrush or voltage kickback.

A third TVSS 1168 is electrically connected between a node 1136 and the node 1122. The third TVSS 1168 is in parallel with the emitter to collector pathway of the n-channel insulated gate bipolar transistor 1132. An avalanche voltage of the third TVSS 1160, may be predetermined to protect the n-channel insulated gate bipolar transistor 1132 from excessive current and/or voltage, such as during current inrush or voltage kickback.

In the example of FIG. 10, a negative-side control board 1200 monitors and regulates the operation of the bidirectional switch 1110. The negative-side control board 1200 may include at least one sensor configured to measure at least one characteristic (e.g., voltage and/or current) of the power controller 902. The at least one characteristic may be measured at any location in the bidirectional switch 1110.

The negative-side control board 1200 may further include a memory and a processor which may store and process instructions to control the bidirectional switch 1110. In some embodiments, the memory and/or processor may be integral to the power controller 902. In some embodiments, the memory and/or processor may be located remotely. In some embodiments, the remote memory and/or processor may be accessed via a wired connection. In some embodiments, the remote memory and/or processor may be accessed wirelessly.

The power system 900 may receive power from a dual rail power supply 1300. The dual rail power supply 1300 may include a voltage source 1310. The voltage source 1310 may be electrically connected to and supply power to the bidirectional switch 910. In some embodiments, a power supply snubber circuit 1312 may be connected across the voltage source 1310 terminals. The power supply snubber circuit 1312 may include a power supply snubber diode 1314 in parallel with a power supply RC snubber 1316 including a power supply snubber capacitor 1318 and a power supply snubber resistor 1320.

The dual rail power supply 1300 may further include a voltage source 1330. The voltage source 1330 may be electrically connected to and supply power to the bidirectional switch 1110. In some embodiments, a power supply snubber circuit 1332 may be connected across the voltage source 1310 terminals. The power supply snubber circuit 1332 may include a power supply snubber diode 1334 in parallel with a power supply RC snubber 1336 including a power supply snubber capacitor 1338 and a power supply snubber resistor 1340.

The power system 900 may additionally include a dual rail load 1400. The dual rail load 1400 may receive power from the dual rail power supply 1300 via the dual-rail bidirectional solid-state power controller 902.

The dual rail load 1400 may include a load 1410. The load 1410 may be electrically connected to and receive power from the bidirectional switch 910. In some embodiments, a load snubber circuit 1412 may be connected across the load 1410 terminals. The load snubber circuit 1412 may include a load snubber diode 1414 in parallel with a load supply RC snubber 1416 including a load snubber capacitor 1418 and a load snubber resistor 1420.

The dual rail load 1400 may further include a load 1430. The load 1430 may be electrically connected to and receive power from the bidirectional switch 1110. In some embodiments, a load snubber circuit 1432 may be connected across the load 1410 terminals. The load snubber circuit 1432 may include a load snubber diode 1434 in parallel with a load RC snubber 1436 including a load snubber capacitor 1438 and a load snubber resistor 1440.

Figure 11:
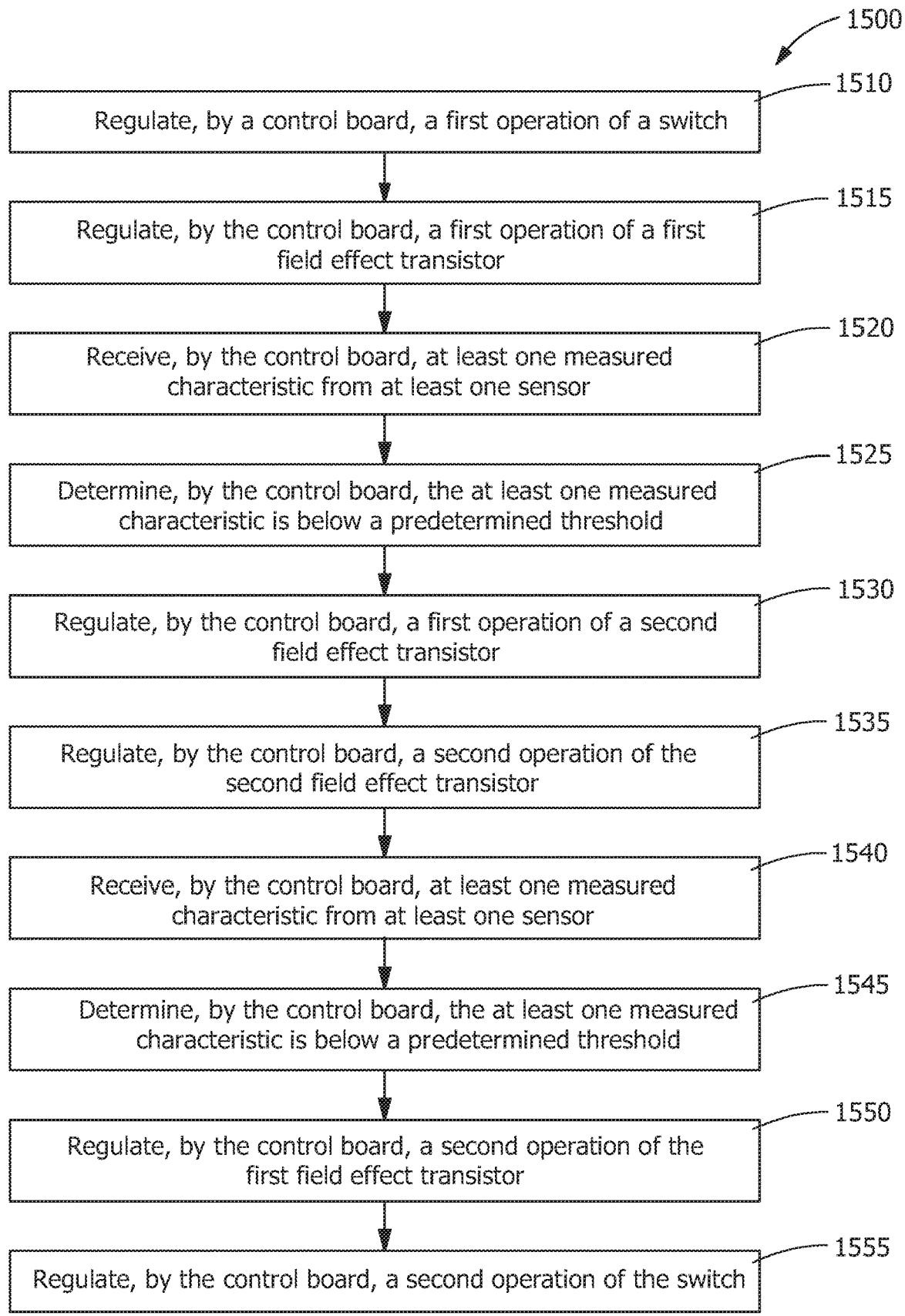
FIG. 11, is a flowchart of a method of regulating the operation of a bidirectional switch, according to an embodiment.

FIG. 11 is a flowchart 1500 of a method of regulating the operation of a bidirectional switch. At block 1510, a control board regulates a first operation of a switch. At block 1515, the control board regulates a first operation of a first field effect transistor. At block 1520, the control board receives at least one measured characteristic from at least one sensor. At block 1525, the control board determines the at least one measured characteristic is below a predetermined threshold. At block 1530, the control board regulates a first operation of a second field effect transistor. At block 1535, the control board regulate a second operation of the second field effect transistor. At block 1540, the control board receives at least one measured characteristic from at least one sensor. At block 1545, the control board determines the at least one measured characteristic is below a predetermined threshold. At block 1550, the control board regulates a second operation of the first field effect transistor. At block 1555, the control board regulates a second operation of the switch.

Figure 12:
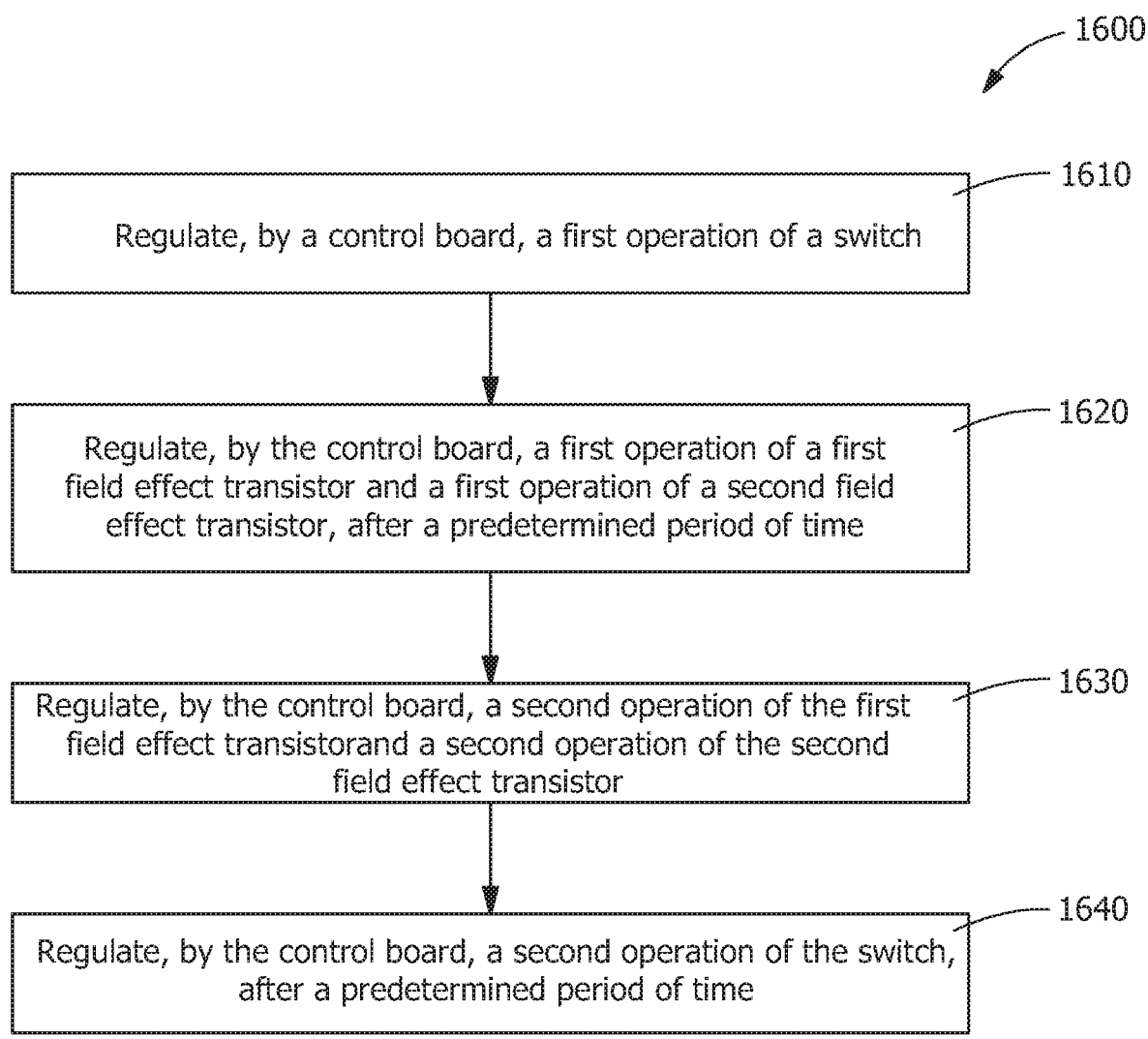
FIG. 12, is a flowchart of a method of regulating the operation of a bidirectional switch, according to an embodiment.

FIG. 12 is a flowchart 1600 of a method of regulating the operation of a bidirectional switch. At block 1610, a control board regulates a first operation of a switch. At block 1620, the control board regulates a first operation of a first field effect transistor and a first operation of a second field effect transistor, after a predetermined period of time. At block 1630, the control board regulates a second operation of the first field effect transistor and a second operation of the second field effect transistor. At block 1640, the control board regulates a second operation of the switch, after a predetermined period of time.

Figure 13:
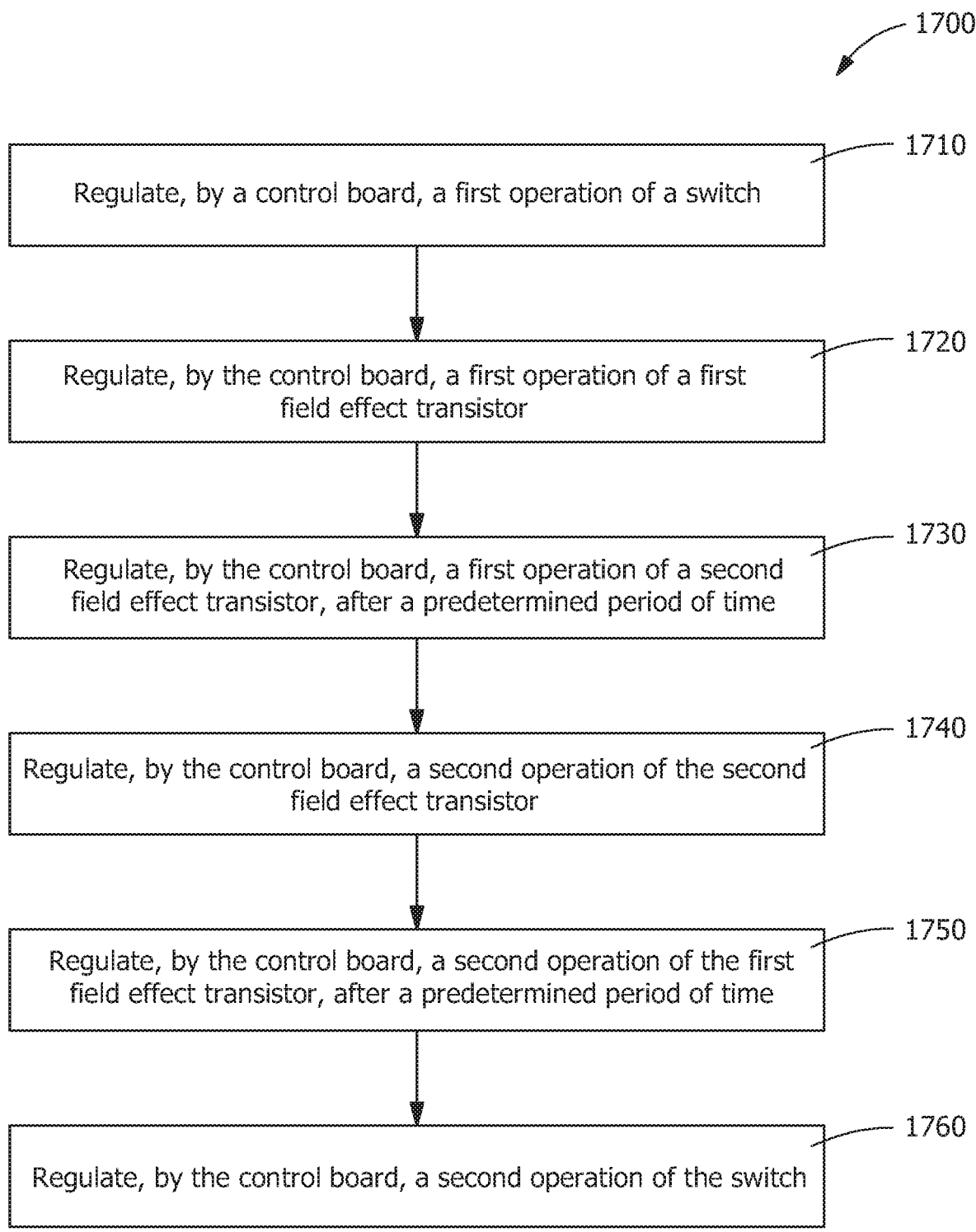
FIG. 13, is a flowchart of a method of regulating the operation of a bidirectional switch, according to an embodiment.

FIG. 13 is a flowchart 1700 of a method of regulating the operation of a bidirectional switch. At block 1710, a control board regulates a first operation of a switch. At block 1720, the control board regulates a first operation of a first field effect transistor. At block 1730, the control board regulates a first operation of a second field effect transistor, after a predetermined period of time. At block 1740, the control board regulates a second operation of the second field effect transistor. At block 1750, the control board regulates a second operation of the first field effect transistor, after a predetermined period of time. At block 1760, the control board regulates a second operation of the switch.

Figure 14:
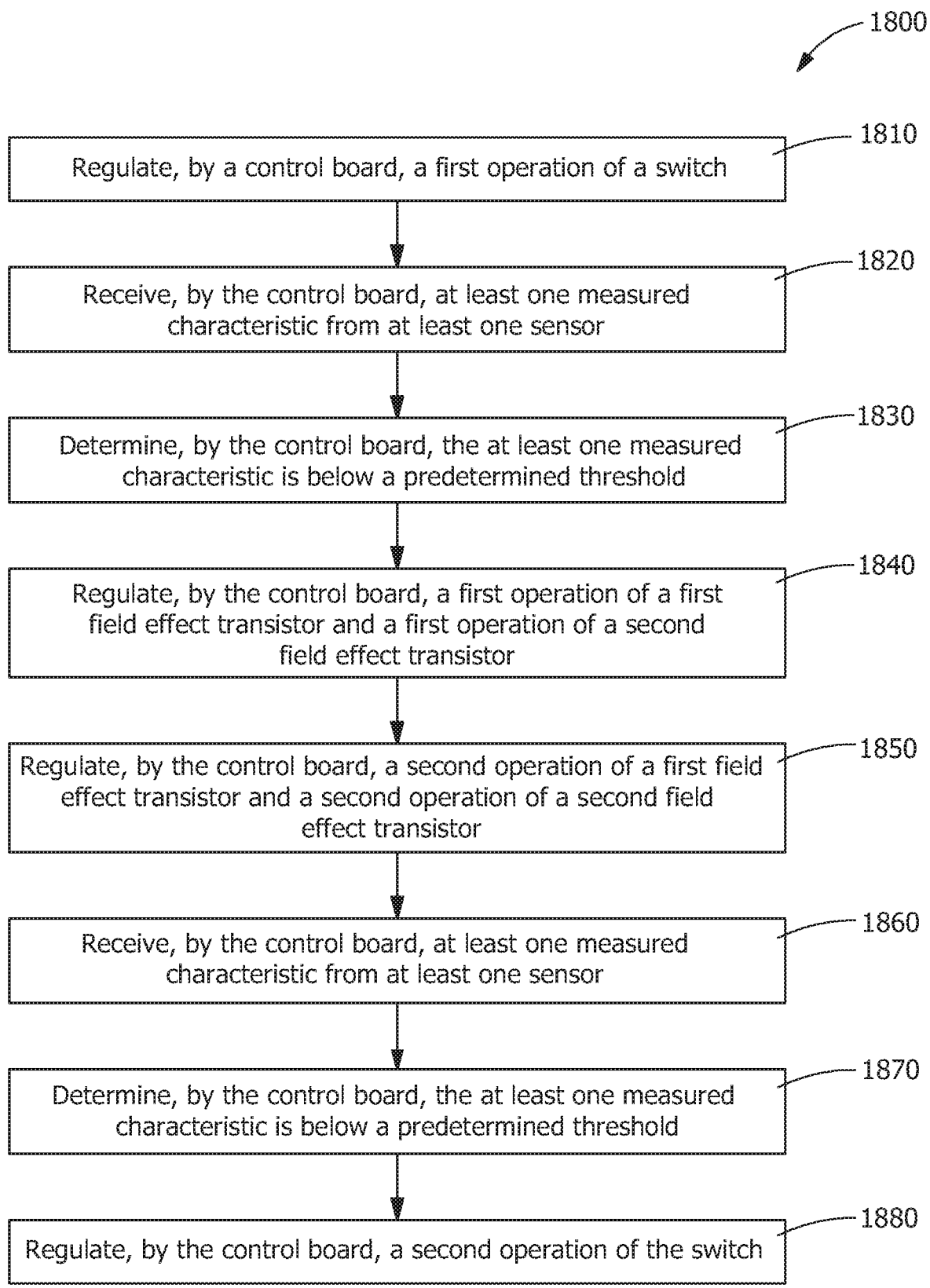
FIG. 14, is a flowchart of a method of regulating the operation of a bidirectional switch, according to an embodiment.

FIG. 14 is a flowchart 1800 of a method of regulating the operation of a bidirectional switch. At block 1810, a control board regulates a first operation of a switch. At block 1820, the control board receives at least one measured characteristic from at least one sensor. At block 1830, the control board determines the at least one measured characteristic is below a predetermined threshold. At block 1840, the control board regulates a first operation of a first field effect transistor and a first operation of a second field effect transistor. At block 1850, the control board regulates a second operation of the first field effect transistor and a second operation of the second field effect transistor. At block 1860, the control board receives at least one measured characteristic from at least one sensor. At block 1870, the control board determines the at least one measured characteristic is below a predetermined threshold. At block 1880, a control board regulates a second operation of the switch.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A bidirectional switch comprising: a first enhancement mode n-channel metal oxide semiconductor field effect transistor having a source, a gate, and a drain; a second enhancement mode n-channel metal oxide semiconductor field effect transistor having a source, a gate, and a drain, wherein the source of the second enhancement mode n-channel metal semiconductor oxide field effect transistor is electrically connected to the source of the first enhancement mode n-channel metal oxide semiconductor field effect transistor; an inrush switch having an insulated gate bipolar transistor having an emitter, a gate, and a collector, wherein the emitter is electrically connected to the common sources of the first enhancement mode n-channel metal semiconductor oxide field effect transistor and the second enhancement mode n-channel metal oxide semiconductor field effect transistor; wherein the inrush switch does not connect to a ground potential; the insulated gate bipolar transistor and the first enhancement mode n-channel metal oxide semiconductor field effect transistor positioned in a first inrush current path and the insulated gate bipolar transistor and the second enhancement mode n-channel metal oxide semiconductor field effect transistor positioned in a second inrush current path; wherein the first enhancement mode n-channel metal oxide semiconductor field effect transistor and the second enhancement mode n-channel metal oxide semiconductor field effect transistor do not conduct simultaneously.

2. The bidirectional switch of claim 1, further comprising a resistor electrically connected to the collector of the insulated gate bipolar transistor.

3. The bidirectional switch of claim 1, further comprising a first terminal of a transient voltage surge suppressor electrically connected to the source of the first field effect transistor, the source of the second field effect transistor, and the emitter of the insulated gate bipolar transistor; and a second terminal of the transient voltage surge suppressor electrically connected to the collector of the insulated gate bipolar transistor.

4. The bidirectional switch of claim 1, further comprising an anti-parallel diode electrically connected between the source and drain of the first field effect transistor.

5. The bidirectional switch of claim 4, further comprising an anti-parallel diode electrically connected between the source and drain of the second field effect transistor.

* * * * *